United States Patent
Aissi et al.

(10) Patent No.: US 9,530,009 B2
(45) Date of Patent: Dec. 27, 2016

(54) SECURE EXECUTION AND UPDATE OF APPLICATION MODULE CODE

(71) Applicant: Visa International Service Association, San Francisco, CA (US)

(72) Inventors: Selim Aissi, Menlo Park, CA (US); Taeho Kgil, Foster City, CA (US); Gyan Prakash, Foster City, CA (US)

(73) Assignee: Visa International Service Association, San Francisco, CA (US)

( * ) Notice: Subject to any disclaimer, the term of this patent is extended or adjusted under 35 U.S.C. 154(b) by 0 days.

(21) Appl. No.: 14/318,070

(22) Filed: Jun. 27, 2014

(65) Prior Publication Data

US 2015/0007262 A1  Jan. 1, 2015

Related U.S. Application Data

(60) Provisional application No. 61/840,340, filed on Jun. 27, 2013.

(51) Int. Cl.

| | |
|---|---|
| *G06F 7/04* | (2006.01) |
| *G06F 17/30* | (2006.01) |
| *G06F 21/60* | (2013.01) |
| *H04L 9/08* | (2006.01) |
| *H04L 29/06* | (2006.01) |
| *H04W 12/04* | (2009.01) |
| *H04L 9/32* | (2006.01) |
| *G06F 7/58* | (2006.01) |

(52) U.S. Cl.
CPC ............... *G06F 21/60* (2013.01); *G06F 7/58* (2013.01); *G06F 21/602* (2013.01); *H04L 9/0866* (2013.01); *H04L 9/0869* (2013.01); *H04L 9/3278* (2013.01); *H04L 63/08* (2013.01); *H04W 12/04* (2013.01); *H04L 2209/56* (2013.01)

(58) Field of Classification Search
CPC ................................ G06F 7/588; G06F 21/60
USPC ............................................................ 726/2
See application file for complete search history.

(56) References Cited

U.S. PATENT DOCUMENTS

| | | | |
|---|---|---|---|
| 5,968,141 A | 10/1999 | Tsai | |
| 6,687,721 B1 | 2/2004 | Wells et al. | |
| 6,816,900 B1* | 11/2004 | Vogel et al. | ........... 709/225 |
| 7,752,616 B2 | 7/2010 | Marolia et al. | |

(Continued)

FOREIGN PATENT DOCUMENTS

| | | |
|---|---|---|
| EP | 2595423 A1 | 5/2013 |
| WO | 2012/135192 A2 | 10/2012 |

OTHER PUBLICATIONS

Arvind Seshadri et al., "Pioneer: Verifying Code Integrity and Enforcing Untampered Code Execution on Legacy Systems", SOSP'05, Oct. 23-26, 2005, 16 pages.

(Continued)

*Primary Examiner* — Dant Shaifer Harriman
(74) *Attorney, Agent, or Firm* — Kilpatrick Townsend & Stockton LLP

(57) ABSTRACT

A dynamic root of trust can be injected in an application module on a client device using a backend server and can be continuously monitored to ensure authenticity, integrity and confidentiality at load time, run time and update time of the application module. The dynamic root of trust can be updated directly from the backend server and can be used to establish a time bound trust chain for the other software modules loaded and executed as part of the application module.

16 Claims, 11 Drawing Sheets

(56) References Cited

U.S. PATENT DOCUMENTS

| | | |
|---|---|---|
| 7,926,087 B1 | 4/2011 | Holl |
| 8,391,864 B2 | 3/2013 | Raleigh |
| 8,438,631 B1 | 5/2013 | Taylor et al. |
| 8,578,361 B2 | 11/2013 | Cassapakis et al. |
| 8,583,920 B1 | 11/2013 | Bursell |
| 8,589,557 B1 | 11/2013 | Labat et al. |
| 8,607,208 B1 | 12/2013 | Arnold et al. |
| 8,613,080 B2 | 12/2013 | Wysopal et al. |
| 8,635,272 B2 | 1/2014 | Reisman |
| 2002/0178370 A1 | 11/2002 | Gurevich et al. |
| 2004/0039762 A1 | 2/2004 | Hars |
| 2005/0221766 A1* | 10/2005 | Brizek et al. ............ 455/73 |
| 2006/0026687 A1* | 2/2006 | Peikari .................. 726/24 |
| 2006/0070066 A1 | 3/2006 | Grobman |
| 2006/0150254 A1 | 7/2006 | Siukonen |
| 2007/0118880 A1 | 5/2007 | Mauro, II |
| 2008/0276298 A1 | 11/2008 | Leterrier et al. |
| 2009/0006854 A1 | 1/2009 | Alkove et al. |
| 2009/0165086 A1 | 6/2009 | Trichina et al. |
| 2009/0307705 A1 | 12/2009 | Bogner |
| 2010/0011116 A1* | 1/2010 | Thornton et al. ............ 709/230 |
| 2010/0269152 A1 | 10/2010 | Pahlavan |
| 2011/0264905 A1 | 10/2011 | Ovsiannikov |
| 2012/0015644 A1 | 1/2012 | Danford et al. |
| 2012/0079282 A1 | 3/2012 | Lowenstein |
| 2012/0084184 A1 | 4/2012 | Raleigh et al. |
| 2012/0102307 A1 | 4/2012 | Wong |
| 2013/0086136 A1 | 4/2013 | Inglett et al. |
| 2013/0347064 A1 | 12/2013 | Aissi |
| 2014/0033323 A1 | 1/2014 | Moroney et al. |
| 2014/0040338 A1 | 2/2014 | Van Der Sluis et al. |
| 2014/0214687 A1 | 7/2014 | Huxam |

OTHER PUBLICATIONS

Andrew Regenscheid, "Roots of Trust in Mobile Devices", ISPAB, Feb. 2012, 5 pages.

Non-final Office Action dated Nov. 17, 2015, U.S. Appl. No. 14/318,266, filed Jun. 27, 2014.

Final Office Action, Mar. 21, 2016, U.S. Appl. No. 14/318,266, 21 pages.

* cited by examiner

SECURE EXECUTION AND UPDATE OF APPLICATION MODULE CODE

CROSS-REFERENCES TO RELATED APPLICATIONS

This application is a non-provisional application of and claims the benefit of priority of U.S. Provisional Application No. 61/840,340 entitled "Secure Container" filed on Jun. 27, 2013, which is herein incorporated by reference in its entirety for all purposes.

BACKGROUND

Client devices such as mobile phones are running more and more sensitive applications. The authenticity, integrity and confidentiality in any application module running on a client device needs to be ensured. These security properties cannot be ensured by relying on the application module itself, the client device's operating system (kernel and platform), or the client' device's firmware/hardware.

Embodiments of the invention address these and other problems, individually and collectively.

BRIEF SUMMARY

A dynamic root of trust can be injected/updated in an application module on a client device using a backend service. The time bound root of trust can be continuously monitored to ensure that is it authentic, has integrity, and is confidential at the load time, run time and/or update time of the application module. The root of trust can be updated directly from the backend service and can be used to establish a dynamic trust chain for the other software modules loaded and executed as part of the application module (e.g. software development kit). In certain implementations, the dynamic root of trust is time bound, wherein the trust chain is updated in response to an expiration of a timer (e.g., watchdog timer). In other implementations, the dynamic root of trust is updated in response to certain events or updates in the code itself.

In certain aspects, the application module may include application module frontend services, an application module kernel, a root of trust and fixed function and non-intelligent software modules. The backend service can perform updates using over-the-air methods based on elapsed times, application module events (e.g., watchdog timer expiration, transaction initiation, secure input provided by the user, etc.), patch cycle, and measured and attested values of the software modules in the application module.

Embodiments of the invention can use a layered update mechanism. A layered update mechanism can be used to update different components of the application module with different frequencies. For example, the update mechanism can allow for frequent updates of the root of trust, frequent updates of the application module kernel, less frequent updates of the application module frontend services and even less frequent updates of fixed function and non-intelligent software modules. The application module layers can be updated with patches, different types of tamper resistance and detection capabilities (e.g., modified code and data encryption, code obfuscation, code morphing, etc.) and revoked key-encryption-keys (KEKs) in key stores. Embodiments of the invention may be used for mobile applications requiring security assurance in a client device, web application servers, etc.

One embodiment of the invention is directed to a method comprising a) determining, by a communication device, that a first root of trust in the communication device needs to be updated, the communication device comprising a memory storing a plurality of application module components; b) receiving, by the communication device, a second root of trust; c) after receiving the second root of trust, determining, by the communication device, attestation values for the application module components in a trust chain verification process; and d) storing, by the communication device, the determined attestation values determined during the trust chain verification process.

Another embodiment of the invention is directed to a communication device comprising a processor and a computer readable medium coupled to the processor, the computer readable medium comprising code, executable by the processor to implement a method comprising: a) determining that a first root of trust in the communication device needs to be updated, the communication device comprising a memory storing a plurality of application module components; b) receiving a second root of trust; c) after receiving the second root of trust, determining attestation values for the application module components in a trust chain verification process; and d) storing the determined attestation values determined during the trust chain verification process.

One embodiment of the invention is directed to a) monitoring, by a remote server computer, a first root of trust in a communication device, the communication device comprising a memory storing a plurality of application module components; b) determining, by the remote server computer, that the first root of trust in the communication device needs to be updated; c) providing, by the remote server computer, a second root of trust to the communication device after determining that the first root of trust in the communication device needs to be updated; d) determining, by the remote server computer, attestation values for the application module components of the communication device in a trust chain verification process; and e) storing, by the remote server computer, the determined attestation values determined during the trust chain verification process.

Another embodiment of the invention is directed to a remote server computer comprising a processor and a computer readable medium coupled to the processor, the computer readable medium comprising code, executable by the processor to implement a method comprising: a) monitoring a first root of trust in a communication device, the communication device comprising a memory storing a plurality of application module components; b) determining that the first root of trust in the communication device needs to be updated; c) providing a second root of trust to the communication device after determining that the first root of trust in the communication device needs to be updated; d) determining attestation values for the application module components of the communication device in a trust chain verification process; and e) storing the determined attestation values determined during the trust chain verification process.

These and other embodiments of the invention are described in further detail below.

DETAILED DESCRIPTION

Figure 1:
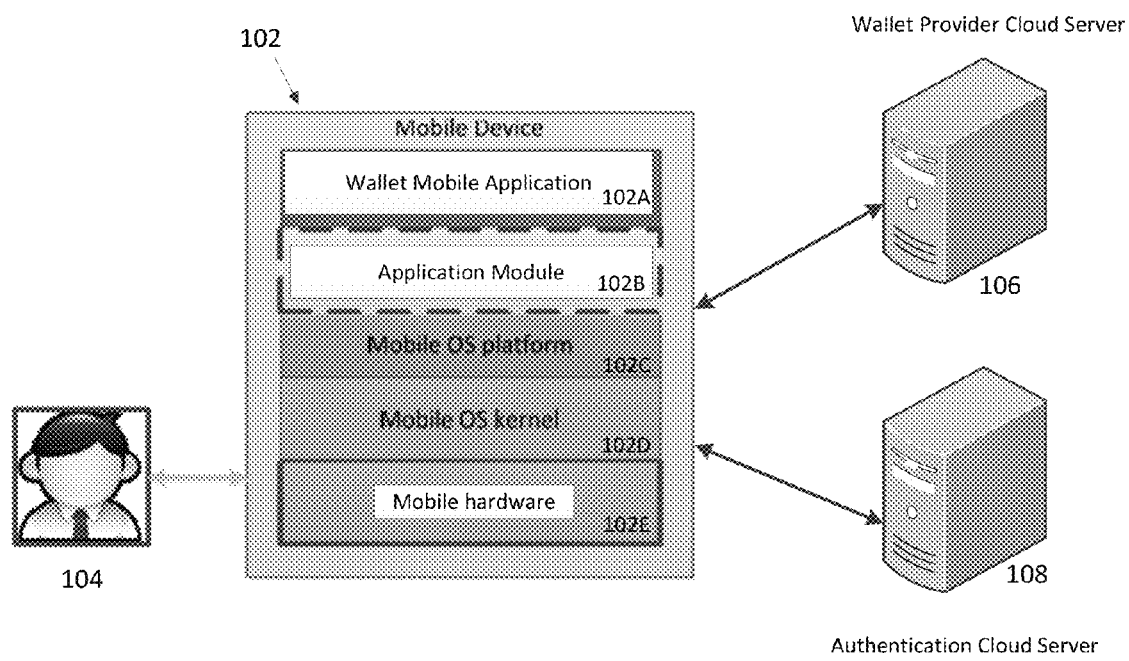
FIG. 1 illustrates a system for secure update and execution of an application module in one embodiment of the invention.

Systems, methods, apparatuses, and computer readable media are described for providing enhanced security for communication devices, in particular, mobile communication devices.

Authenticity, integrity and confidentiality in a security application module running on a client device such as a mobile phone need to be ensured to the fullest extent. Most security systems and modules define and anchor their security solution based on a Root of Trust (RoT). Typically, a root of trust is a system element that is inherently trusted by design. Typical solutions rely on hardware means to build a root of trust, for example, using a ROM or a flash memory. However, in many instances, the operating system and other client applications may not be trusted. Additionally, access to the hardware RoT may be through interfaces provided by the operating system. If the operating system is not trusted the software executing above the operating system, such as the security application module, has no assurance that it can trust the hardware RoT accessible through the operating system. Further, in some instances, a security application module can be cloned or otherwise tampered with. Thus, update and execution of a hardened RoT that the security application module can trust, even in instances where the underlying operating system may be in an indeterminate trust state is desirable.

Embodiments of the invention provide a software based root of trust. A root of trust can be confined to a specific domain and can define an origin of a trust chain. However, since the software based root of trust can be vulnerable to attacks, some embodiments of the invention provide a dynamic root of trust that can provide enhanced level of security. The dynamic nature of the root of trust and the trust chain built using the dynamic root of trust can ensure the authenticity, integrity and confidentiality at load time, run time and update time of the security application module.

Typically, the root of trust is built upon a standalone system. Since, in most instances, a standalone system may not provide highest level of security, embodiments of the invention further utilize a backend service to harden the security application modules on a client device through a layered approach. For example, some embodiments of the invention allow building a root of trust and a trust chain among different layers of the security application module in association with the backend service. The backend service can also manage and monitor the run time, load time and update time measurement/attestation values of the security application module and the underlying client device. The backend service can also compare the attestation values of the security application module received from the client device with the attestation values determined by rebuilding the trust chain on the backend server to determine if the software and hardware of the client device has not been tampered with during the update and execution of the security application module.

Prior to discussing embodiments of the invention, description of some terms may be helpful in understanding embodiments of the invention.

A "root of trust" may define an origin of a trust chain. In embodiments of the invention, a root of trust is implemented in software that has heavy tamper resistance. For example, in some embodiments, a root of trust may be hardened and trusted functional code that executes other software layers. In some embodiments, a root of trust is a root key (e.g., a string of characters) that may be used to encrypt keys associated with other software modules or act as the root for measurement of other software modules. In yet some embodiments, the root of trust may be a combination of functional code and root key, as described above. In embodiments of the invention, a root of trust may be dynamic. For example, the root of trust may be time bound, i.e., the root of trust changes over time.

A "communication device" may include a client device that can communicate with a backend server. For example, in some embodiments, a communication device is a mobile device. Some examples of a mobile device include a mobile phone, a PDA, a laptop, a tablet, etc.

"Application module components" may include one or more components of an application module. For example, the application module may be a software development kit (SDK) for a mobile device. In some embodiments, the application module components include an application module front end, an application module kernel and an application module root of trust. Different application module components can have different tamper resistance. For example, the application module front end can have low tamper resistance, the application module kernel can have medium tamper resistance and the application module root of trust can have high tamper resistance.

"Attestation values" may include values that indicate that a module is trustworthy. For example, attestation values of a module can indicate that the module has not been tampered with. In one embodiment, attestation values may be determined by performing measurements of the module. In another embodiment, attestation values may be in the form of a certificate or a key associated with the module.

A "measurement" may refer to a process to determine attestation values of a module. In some embodiments, measurement may include taking a fingerprint of the state of the module, for example, by taking a hash of the executable code of the module. For example, a hash function such as SHA-1 may be used to calculate a hash of an application module or an application module component. In one embodiment, measurement values may represent virtual form of platform configuration registers (PCRs).

A "trust chain verification process" may include a process to verify a trust chain. In some embodiments, a trust chain verification process starts from a root of trust. In some embodiments, a root of trust can verify or attest a first software layer built upon the root of trust, the first software layer can verify a second software layer built upon the first software layer and so on. For example, a trust chain verification process may include exchange of certificates or keys between different software layers. In one embodiment, a trust chain verification process may include determining attestation values for different layers in the trust chain and comparing with corresponding attestation values determined by a remote server computer.

A "remote server computer" may typically be a powerful computer or cluster of computers. For example, the remote server computer can be a large mainframe, a minicomputer cluster, or a group of servers functioning as a unit. The remote server computer may be associated with an entity such as a payment processing network, a wallet provider, a merchant, an authentication cloud, an acquirer or an issuer.

A "secure channel" may be a networking channel between two entities, such as a remote server computer and mobile device, that may allow the two entities to communicate with each other through a secure channel without eves dropping by a third entity, spoofing of the communication by a third entity or masquerading of the third entity as one of the two expected entities participating in the secure communication. Known techniques, such as secure socket layer (SSL) protocols may be used in establishing a secure channel.

FIG. 1 illustrates a system 100 for secure update and execution of an application module in one embodiment of the invention.

The system 100 may include a mobile device 102 that may be communicatively coupled to a wallet provider cloud server 106 and an authentication cloud server 108 via one or more communication networks (not shown). For example, the communication network may be a TCP/IP based network, cellular network or any other suitable network. The mobile device 102 may also be connected to a mobile network operator and/or an internet service provider data network. In some embodiments of the invention, a secure channel (e.g., SSL based channel) is established for communication between the mobile device 102, the wallet provider cloud server 106 and the authentication cloud server 108.

A user 104 may be an individual or a person who is able to operate the mobile device 104. The user 104 may be able to download one or more applications on the mobile device 102. For example, the user 104 may be able to download a wallet application on the mobile device 104, to register one or more payment accounts with the authentication cloud server 108 using the mobile device 102, to use the wallet application to make a payment for a transaction, to enter a PIN or a password to authenticate for a transaction, etc.

The mobile device 102 may be a communication device that may be configured to communicate with the wallet provider cloud server 106 and the authentication cloud server 108 via one or more communication networks. The mobile device 102 may be a mobile phone, a tablet, a notebook, a PDA, a laptop, a netbook, a key fob, etc. The depiction of mobile device 102, as shown in FIG. 1, illustrates an example software stack implemented within the mobile device 102. For example, the mobile device 102 may include a wallet mobile application 102A, an application module 102B, a mobile OS (operating system) platform 102C, a mobile OS (operating system) kernel 102D and mobile hardware 102E.

The wallet mobile application 102A may be an application that may be used to conduct financial transactions using the mobile device 102 such as to make payments or to perform money transfer. In some embodiments, the wallet mobile application 102A may be associated with one or more payment accounts (e.g., credit or debit card account), loyalty accounts, etc. for the user 104.

The application module 102B may include an SDK (software development kit) such as a security SDK. In some embodiments of the invention, the application module 102B may be provided by the authentication cloud server 108. In some embodiments, execution and update of the application module 102B can be controlled through the backend service provided by the authentication cloud server 108. In some embodiments, the wallet provider cloud server 106 may download the application module 102B from the authentication cloud server 108 and integrate with the wallet mobile application 102A. For example, the application module may be accessed using the wallet mobile application 102A. In some embodiments, the application module 102B may be used to ensure the security of the payment transactions driven by the wallet mobile application 102A using the mobile device 102. In some embodiments, the application module 102B may include a version number, a digital certificate, a transport key, a wallet identifier, a wallet provider authentication cloud key, a shared secret, etc. In some embodiments, the user 104 may download the wallet mobile application 102A that is integrated with the application module 102B to the mobile device 102 from the wallet provider cloud server 106.

The mobile OS platform 102C can provide an operating system platform to run other programs such as applications (e.g., wallet mobile application 102A and application module 102B) on the mobile device 102. An operating system may be a collection of software that manages computer hardware resources and provides common services for applications.

The mobile OS kernel 102D can provide the base OS functionality for the mobile device 102. The mobile OS kernel 102D may be configured to manage the mobile device 102's hardware and resources (e.g., memory, CPU, I/O device, etc.) and allow other programs (e.g., applications) to run and use these resources.

The mobile hardware 102E may include a communication interface (e.g., WiFi, 2G/3G/4G modem), timer, system memory, storage memory (e.g., flash, multimedia card, etc.), video/graphics/display card, audio, touch screen, keyboard, GPS, camera, and other suitable hardware components.

The wallet provider cloud server 106 may be configured to build the wallet mobile application 102A and to integrate the wallet mobile application 102A with the application module 102B.

The authentication cloud server 108 may be a remote server computer that can provide backend service to the application module 102B to build a dynamic root of trust and trust chain. The authentication cloud server 108 can inject and update the dynamic root of trust in the application module 102B on the mobile device 102. The authentication cloud server 108 can monitor the root of trust associated with the application module 102B and push over-the-air updates or changes (e.g., using a wireless network such as WiFi, mobile broadband, etc.) to harden the application module 102B. For example, the updates may be derived by elapsed time, application module events (e.g., watchdog timer expiration, transaction initiation, secure input provided by the user 104), patch cycle, measured and attested values of the software modules in the application module 102B). The authentication cloud server 108 can manage and monitor the run time, load time and update time measurement/attestation values of the application module 102B and the underlying mobile device 102. The authentication cloud server 108 can compare the attestation values of the application module 102B by rebuilding a trust chain and comparing with the respective attestation values. In some embodiments, the authentication cloud server 108 may be associated with a payment processing network such as VisaNet® operated by Visa®.

Figure 2:
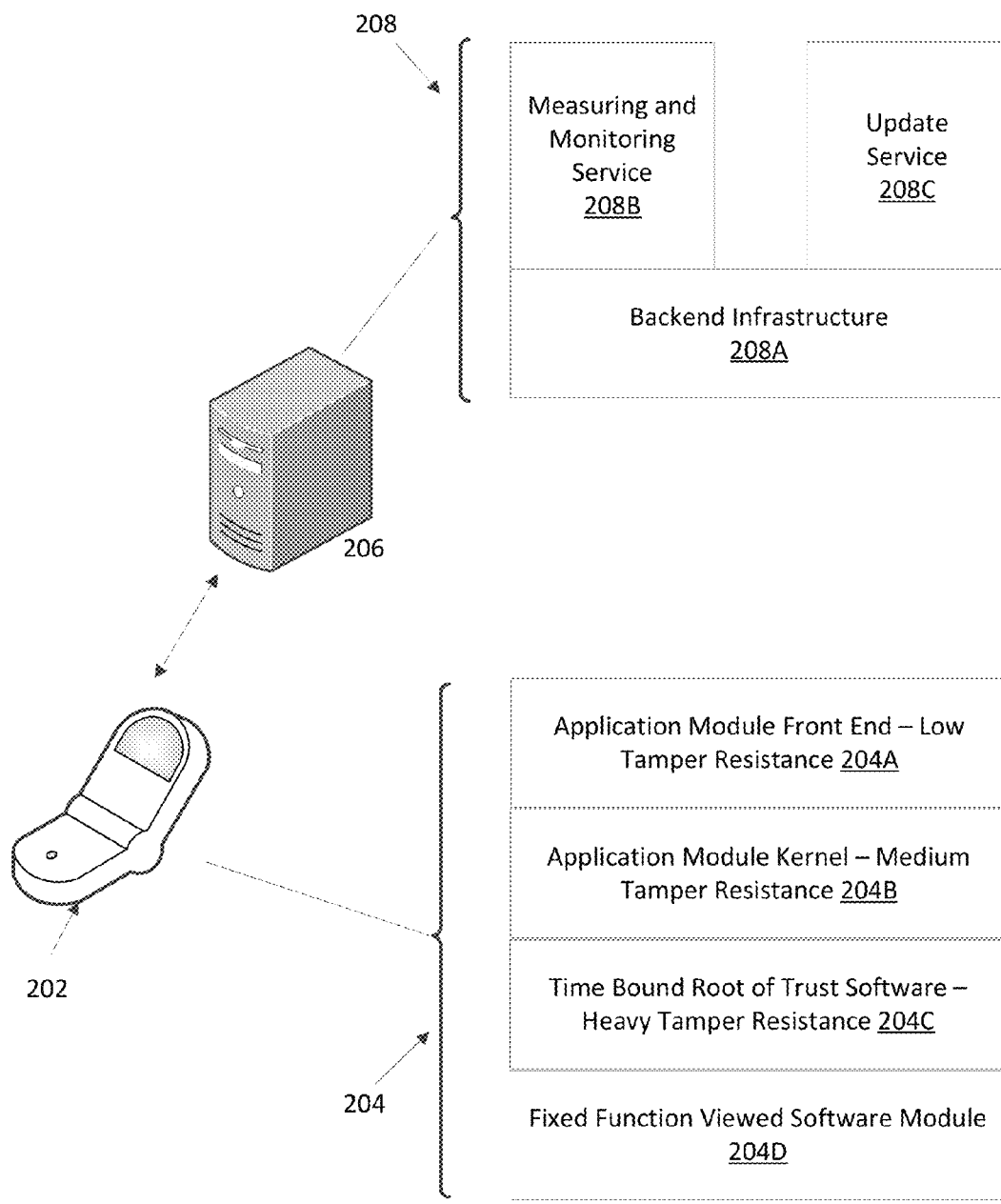
FIG. 2 illustrates some components of an exemplary system according to an embodiment of the invention.

FIG. 2 illustrates some components of an exemplary system 200 according to an embodiment of the invention.

As illustrated in the figure, a backend server 206 may provide backend verification to a mobile device 202 using a secure channel. The mobile device 202 may be similar to the mobile device 102. The backend server 206 may be similar to the authentication cloud server 108. The mobile device 202 may include an application module 204 that may be similar to the application module 102B. The application module 204 may comprise various components or software layers, for example, an application module front end 204A, an application module kernel 204B, a time bound root of trust software 204C and a fixed function viewed software module 204D.

The application module front end 204A may provide frontend services for the application module 204 that are built on top of the application module kernel 204B. For example, the application module front end 204A may provide interface to the backend server 206 for updates to the application module 204. In some embodiments, the application module front end 204A can exhibit low tamper resistance and may require less frequent updates from the backend server 206. In some embodiments, the application module front end 204A may provide services for interfacing with other applications (such as providing an application programming interface (API)), application module updates, authentication and binding, transaction and payment assurance, etc.

The application module kernel 204B can provide another layer of abstraction. In some embodiments, the application module kernel 204B may perform mapping and abstracting of the system resources in the underlying mobile OS platform 102C and expose it to the wallet mobile application 102A. In some embodiments, the application module kernel 204B can exhibit medium tamper resistance and may require frequent updates from the backend server 206.

The time bound root of trust software 204C can exhibit most rigorous level of tamper resistance and may require very frequent updates from the backend server 206. The dynamic root of trust software 204C can establish a chain of trust for the other software modules loaded and executed as part of the application module 204. For example, in some embodiments, the dynamic root of trust software 204C can establish a trust chain by attesting the application module kernel 204B that can attest the application module front end 204A. In some embodiments, when the dynamic root of trust software 204C is updated by the backend server 206, the trust chain is rebuilt to incorporate the root of trust updates.

In some embodiments, the fixed function viewed software module 204D may function as a virtual machine that can process the application module kernel 204B code and data. In some embodiments, the fixed function viewed software module 204D may be based on a non-native instruction set architecture and may include a system call emulator. For example, the fixed function viewed software module 204D may include system calls, interrupt routines, input/output routines and other low level activities. The fixed function viewed software module 204D may seldom require updates. In some embodiments of the invention, the fixed function viewed software module 204D may not be part of the trust chain.

The backend server 206 may include components 208 comprising a backend infrastructure 208A, a measuring and monitoring service 208B and an update service 208C.

The backend infrastructure 208A may include infrastructure to support the components of the backend server 206, e.g., the measuring and monitoring service 208B and the update service 208C. For example, the backend infrastructure 208A may include one or more of a processor, memory, database, network interfaces, etc.

The measuring and monitoring service 208B may monitor the attestation values associated with the root of trust and/or the chain of trust for the application module 204. The measuring and monitoring service 208B may also perform measurements to determine attestation values for various software layers of the application module 204 to determine if the attestation values match with the attestation values determined by the mobile device 202.

The update service 208C can update the root of trust software 204C based on certain timers or application events. For example, in some embodiments of the invention, updates can be driven by elapsed time, occurrence of an application module event (e.g., watch dog timer expiration, transaction initiation, secure input provided by the user 104, etc.), patch cycle, measured and attested values of the software modules in the application module 102B, etc. The update service 208C may provide patches, different types of tamper resistance and detection capabilities (e.g., modified code and data encryption, code obfuscation, code morphing, etc.) and revoked KEKs (key encryption keys) on key stores.

Figure 3:
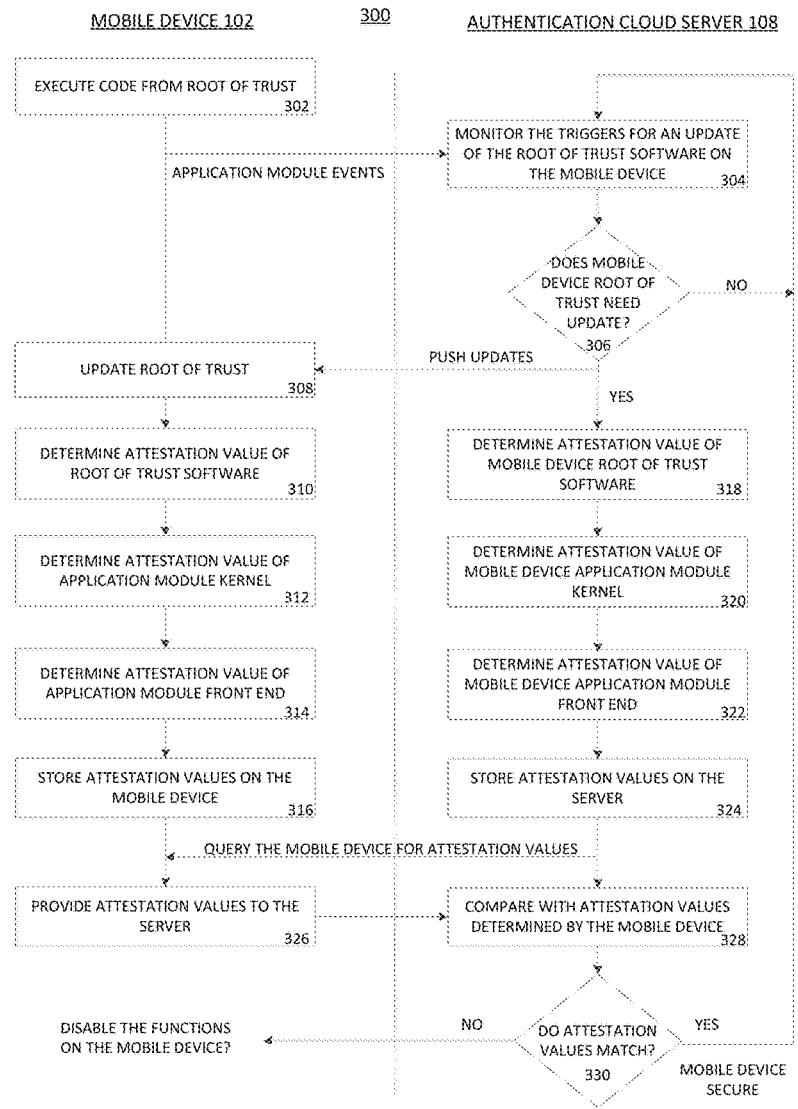
FIG. 3 illustrates a process flow for the update and monitoring of a root of trust in one embodiment of the invention.

FIG. 3 illustrates a process flow 300 for the update and monitoring of a root of trust in one embodiment of the invention.

In step 302, the application module 102B code is executed from the root of trust on the mobile device 102. For example, the root of trust may be a first root of trust that may be part of the initialization routine of the application module 102B. Referring back to FIG. 2, the application module kernel 204B can run the application module front end 204A on the dynamic root of trust software 204C.

In step 304, the authentication cloud server 108 can monitor a number of triggers to determine if the root of trust software on the mobile device 102 may need an update. In some embodiments, the triggers may be driven by occurrence of an application module event on the mobile device 102. For example, if the user 104 initiates a transaction or enters a secure input (e.g., a PIN or a password) using the mobile device 102, the authenticity, integrity and confidentiality in the application module 102B may need to be ensured (e.g., validating that the PIN or the payment account information used for the transaction was not broken into or tampered with). The application module event may also include expiration of timers on the mobile device 102, for example, watchdog timers. In some embodiments, the triggers may be driven by a specific time elapsed on the authentication cloud server 108. For example, the root of trust may be time bound based on a timer that expires after a fixed or a variable time period. In some embodiments, the triggers may be driven based on the patch cycle of the application module contents, e.g., a patch or update may need to be applied to one or more software layers of the application module 102B. In some embodiments, the triggers may be driven by the measured and attested values of various components in the application module 102B. For example, if the attestation values of one or more software components in the application module 102B do not match with the corresponding attestation values determined by the authentication cloud server 108, the root of trust and the trust chain may need to be updated on the mobile device 102.

In step 306, if the authentication cloud server 108 determines that the root of trust does not need an update, the authentication cloud server 108 may continue to monitor the triggers.

In step 308, if the authentication cloud server 108 determines that the root of trust needs an update then the authentication cloud server 108 may send a second root of trust (e.g., using over-the-air methods) to the mobile device 102. For example, the second root of trust may be an updated first root of trust or may be generated by the authentication cloud server 108.

In step 310, an attestation value for the root of trust software 204C may be determined. In one embodiment, the attestation value may be determined by measuring the root of trust software 204C, for example, by calculating a hash of the root of trust software 204C. In some embodiments of the invention, update of the root of trust results in re-measuring all the software layers built upon the root of trust software 204C, for example, the application module kernel 204B and the application module frontend 204A.

In step 312, an attestation value for the application module kernel 204B may be determined. In one embodiment, the attestation value may be determined by measuring the application module kernel 204B, for example, by calculating a hash of the application module kernel 204B. In some embodiments of the invention, update of the application module kernel 204B results in re-measuring the software layer built upon the application module kernel 204B, e.g., the application module frontend 204A.

In step 314, an attestation value for the application module front end 204A may be determined. In one embodiment, the attestation value may be determined by measuring the application module front end 204A, for example, by calculating a hash of the application module front end 204A.

In step 316, the attested values may be stored on the mobile device 102 (or elsewhere in other embodiments). In one embodiment, the attested values, for example, attestation values determined in steps 310, 312 and 314 may be stored in a data store on the mobile device 102.

In step 318, the authentication cloud server 108 may determine, in parallel or at a later time, an attestation value of the root of trust software 204C. In one embodiment, the attestation value may be determined by measuring the root of trust software 204C, for example, by calculating a hash of the root of trust software 204C. In another embodiment, the attestation value of the root of trust software 204C may already be stored in a memory coupled to the authentication cloud server 108.

In step 320, the authentication cloud server 108 may determine, in parallel or at a later time, an attestation value of the application module kernel 204B. In one embodiment, the attestation value may be determined by measuring the application module kernel 204B, for example, by calculating a hash of the application module kernel 204B. In another embodiment, the attestation value of the application module kernel 204B may already be stored in a memory coupled to the authentication cloud server 108.

In step 322, authentication cloud server 108 may determine, in parallel or at a later time, an attestation value of the application module front end 204A. In one embodiment, the attestation value may be determined by measuring the application module front end 204A, for example, by calculating a hash of the application module front end 204A. In another embodiment, the attestation value of the application module front end 204A may already be stored in a memory coupled to the authentication cloud server 108.

In step 324, the attestation values determined in steps 318, 320 and 322 may be stored in a memory coupled to the authentication cloud server 108. The authentication cloud server 108 may query the mobile device 102 for the attestation values determined by the mobile device 102. In some embodiments of the invention, the authentication cloud server 108 may query the mobile device 102 for the attestation values at any point in time, e.g., after step 318, step 320, step 322 or another point in time.

In step 326 the mobile device 102 may provide the attestation values to the authentication cloud server 108 in response to the query. In one embodiment, the attestation values may be in the form of a certificate.

In step 328, the authentication cloud server 108 may compare the attestation values provided by the mobile device 102 with the stored attestation values. In one embodiment, the authentication cloud server 108 may verify the certificate received from the mobile device, In step 330, if the attestation values match or the certificate is validated then the mobile device 102 may be deemed secure. If the attestation values do not match or the certificate is not validated then the mobile device 102 may be deemed insecure and the functions on the mobile device 102 may be disabled, e.g., the wallet mobile application 102A may be disabled.

Figure 4:
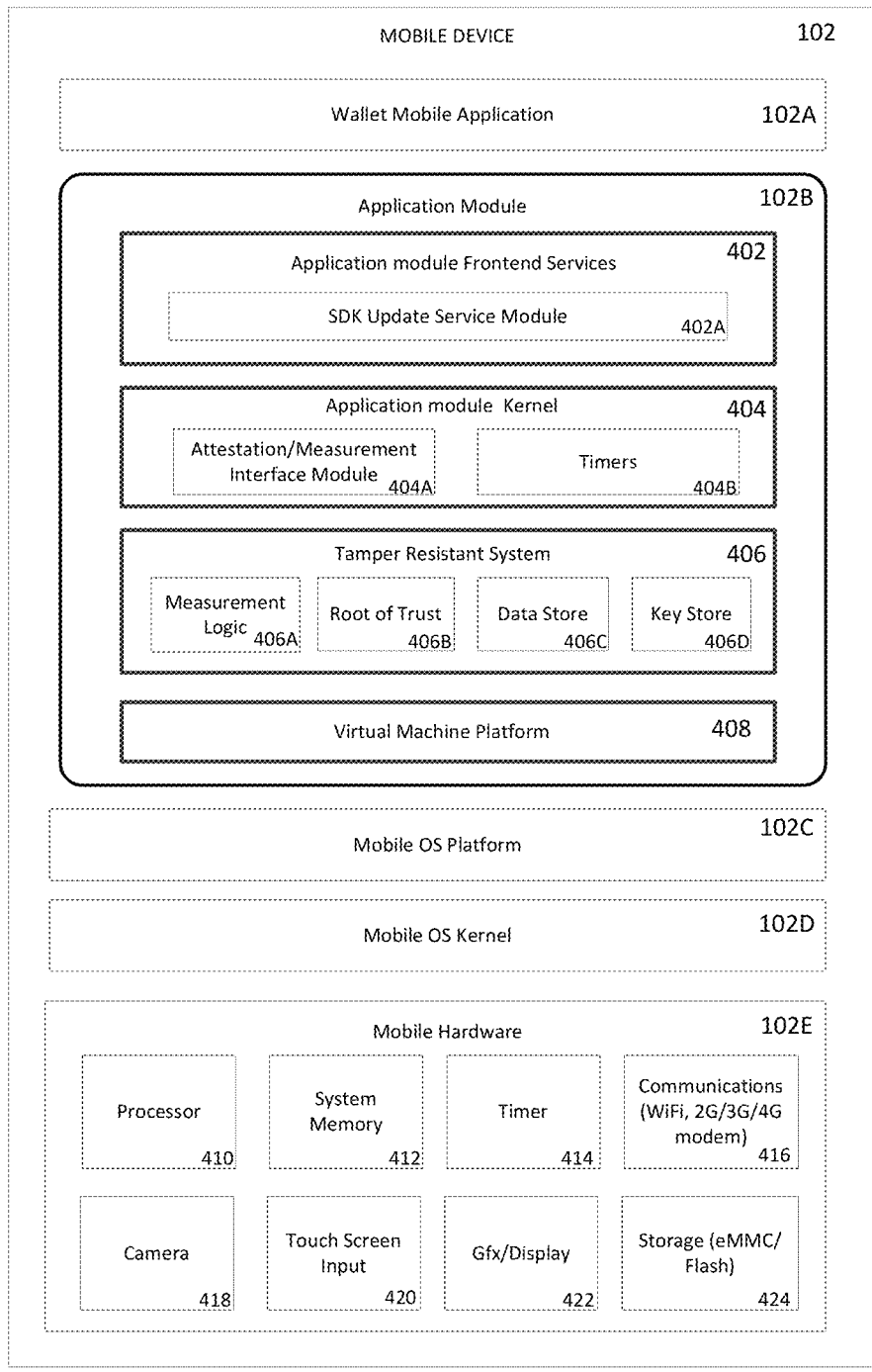
FIG. 4 illustrates some components of the mobile device in one embodiment of the invention.

FIG. 4 illustrates some components of the mobile device 102 in one embodiment of the invention.

The application module 102B may include an application module frontend services 402, an application module kernel 404, a tamper resistant system 406 and a virtual machine platform 408. Note that in other embodiments, the application module 102B may include more or less components than illustrated in FIG. 4.

The application module frontend services 402 may be similar to the application module front end 204A as discussed with reference to FIG. 2. The application module frontend services 402 may include an SDK update service module 402A. The SDK update service module 402A may allow secure and authentic update of the application module 102B. For example, update of the application module 102B may be performed by the authentication cloud server 108 and may be decoupled from the mobile device 102 app store. In some embodiments, the application module frontend services 402 may provide attestation values of the software modules in response to the query from the authentication cloud server 108.

The application module kernel 404 is similar to the application module kernel 204B as discussed with reference to FIG. 2. The application module kernel 404 may include an attestation and measurement interface module 404A and timers 404B. The attestation and measurement interface module 404A may allow the application module frontend services 402 to retrieve periodically or event triggered attestation or measurement values from the tamper resistant system 406. The attestation and measurement interface module 404A can also allow binding and measurement of various states of the application module 102B. In some embodiments, the attestation values are sealed before providing to the authentication cloud server 108.

The timers 404B may include watchdog timers, regular timers, monotonic counters, etc. Some of the timers may be synchronized with the authentication cloud server 108 based on the heartbeat received from the authentication cloud server 108. In some embodiments, expiration of the watchdog timer may trigger an update of the roof of trust and the trust chain.

The tamper resistant system 406 may include a measurement logic 406A, a root of trust 406B, a data store 406C and a key store 406D. The measurement logic 406A may be used to measure the root of trust 406B, e.g., by taking a hash. The data store 406C may store data-at-rest, e.g., attestation values measured by the measurement logic 406A. The key store 406D may stores encryption key. The data store 406C and key store 406D may be protected using key encryption key (KEK) that may be managed by the tamper resistant system 406.

The virtual machine platform 408 can provide a software based emulation of a machine. The virtual machine platform 408 may be based on a non-native instruction set architecture (ISA) and may function as a system call emulator. In some embodiments of the invention, the virtual machine platform 408 may be simplified as a fixed function viewed software module to help prevent tampering of the virtual machine code. The virtual machine platform 408 may provide a computing platform to run the application module kernel 404.

The mobile hardware 102E may include a processor 410, a system memory 412, a timer 414, communications 416, a camera 418, a touch screen input 420, a graphics display 422 and a storage. The processor 410 may be configured to execute instructions or code in order to implement methods, processes or operations. The system memory 412 may include a computer readable medium that may comprise code executable by the processor 410 for implementing methods using some embodiments of the invention.

The graphics display 422 may allow a user to view text, numbers, multimedia, and other information. The touch screen input 420 may allow the user 104 to interact with the mobile device 102 using a touch screen. In some embodiments, the user 104 may use a keypad (not shown) instead of or in addition to the touch screen interface to enter data into the mobile device 102. The camera 418 may enable the user 104 to take pictures, videos and scan bar codes. The communications 416 may provide a communication interface with different communication networks such as WiFi, 2G/3G/4G modem, etc. The storage 424 may include flash, embedded multimedia card (eMMC), secure digital (SD) card, etc.

Figure 5:
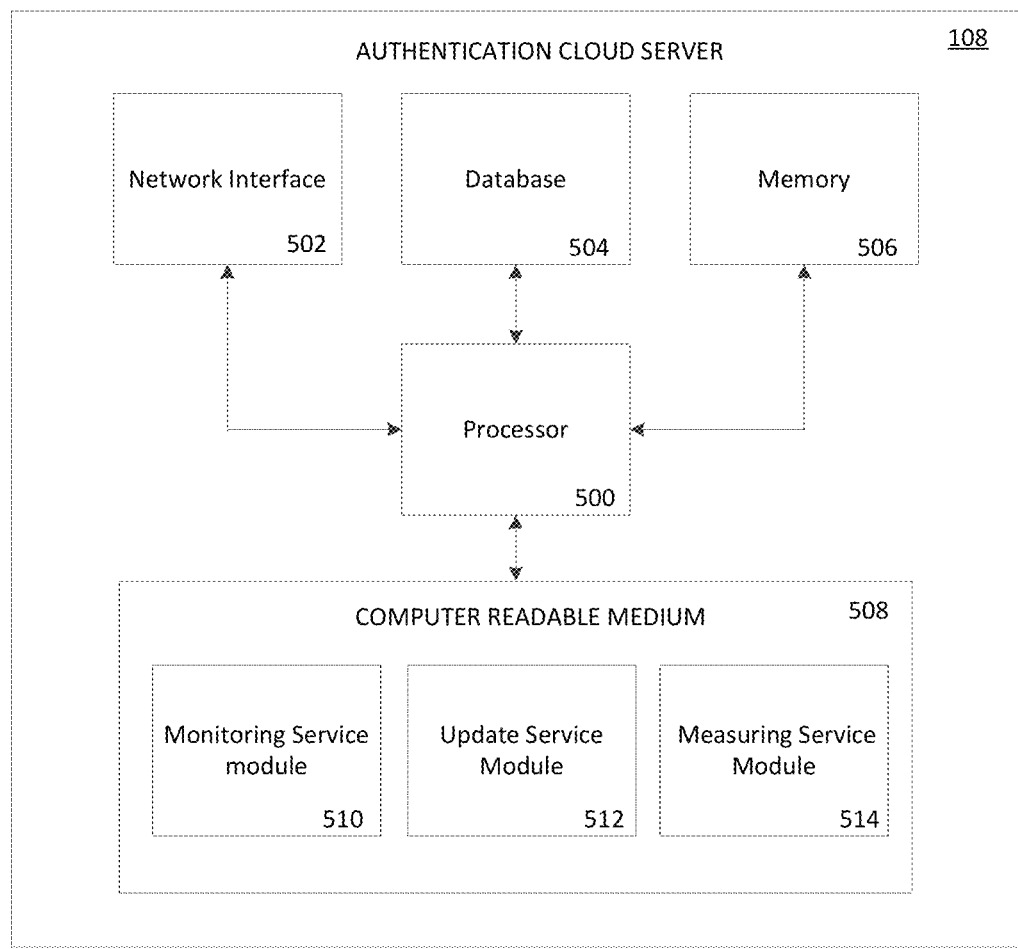
FIG. 5 illustrates some components of the authentication cloud server, in one embodiment of the invention.

FIG. 5 illustrates some components of the authentication cloud server 108, in one embodiment of the invention.

The authentication cloud server 108 may include a processor 500 operatively coupled to a network interface 502, a database 504, a memory 506 and a computer readable medium 508. The computer readable medium 508 may comprise instructions or code, executable by the processor 500. The computer readable medium 500 may comprise a monitoring service module 510, an update service module 512 and a measuring service module 514.

The network interface 502 may be configured to communicate with the mobile device 102, the wallet provider cloud server 106 and other entities (not shown) using one or more communications networks.

The database 504 may be configured to store information associated with the mobile device 102 and the consumer 104. For example, the database 504 may store payment account information associated with the wallet mobile application 102A (e.g., account numbers, expiration dates, issuer information, etc.), user personal information (e.g., name, address, phone number, etc.)

The memory 506 may be configured to store attestation values for different software components associated with different client devices such as the mobile device 102. The memory 506 be a non-volatile memory that can retain the information in the absence of power. The memory 506 may also store the code for the application module 102B.

The monitoring service module 510 can monitor the root of trust on the mobile device 102. For example, as discussed with reference to FIG. 3, the monitoring service module 510 may monitor the triggers in step 304 to determine if the root of trust 406B needs an update.

The update service module 514 can update the root of trust 406B on the mobile device 102. For example, as discussed with reference to FIG. 3, if the root of trust 406B on the mobile device 102 needs an update as determined by the monitoring service module 510, the update service module 514 can push updates to update the root of trust 406B. For example, the update service module 514 can regenerate a new root of trust and load it on the mobile device 102 via a secure channel.

The measuring service module 512 can determine the attestation values for different software components of the application module 102B. For example, as discussed with reference to FIG. 3, the measuring service module 512 can determine the attestation values for the root of trust software, the application module kernel and the application module frontend as discussed in steps 318, 320 and 322. Further, the measuring service module 512 can query the mobile device 102 for the attestation values for different software components, for example, determined in steps 310, 312 and 314 with reference to FIG. 3. The measuring service module 512 can compare the respective attestation values (e.g., in step 328) to determine if the mobile device software and hardware was not tampered with.

Figure 6:
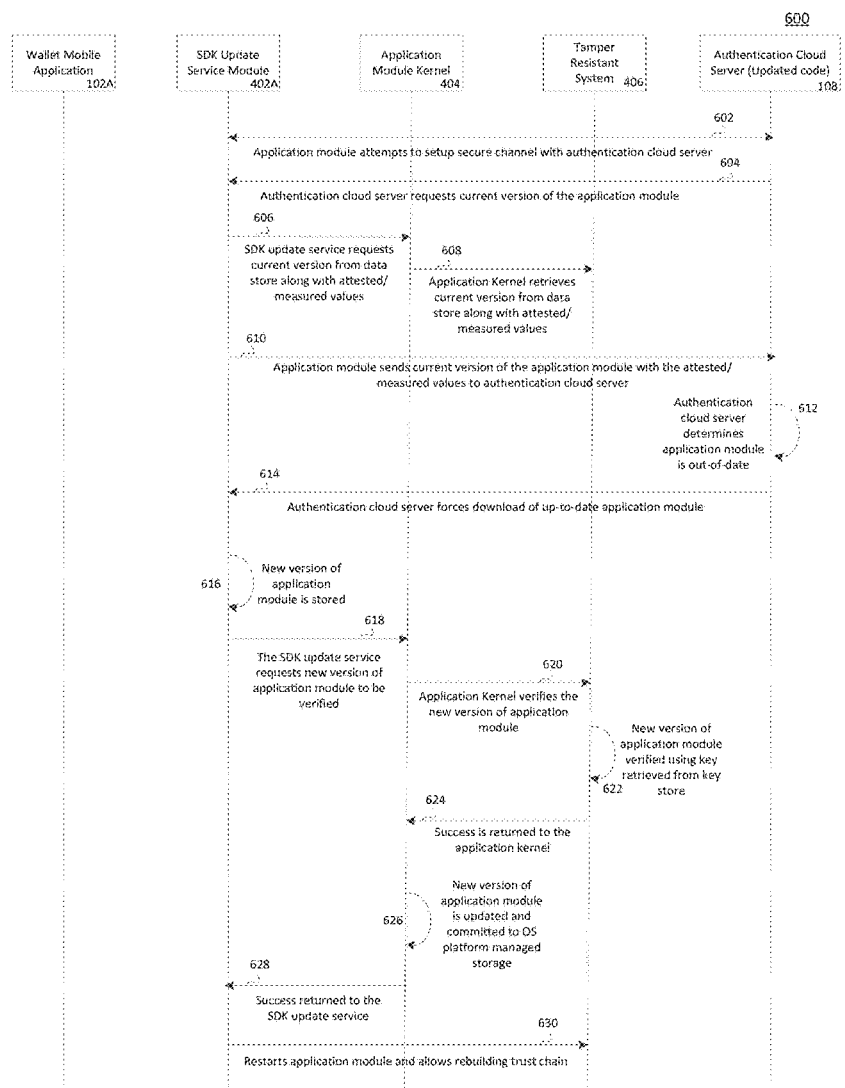
FIG. 6 illustrates a process flow for the secure update of an application module.
Figure 7A:
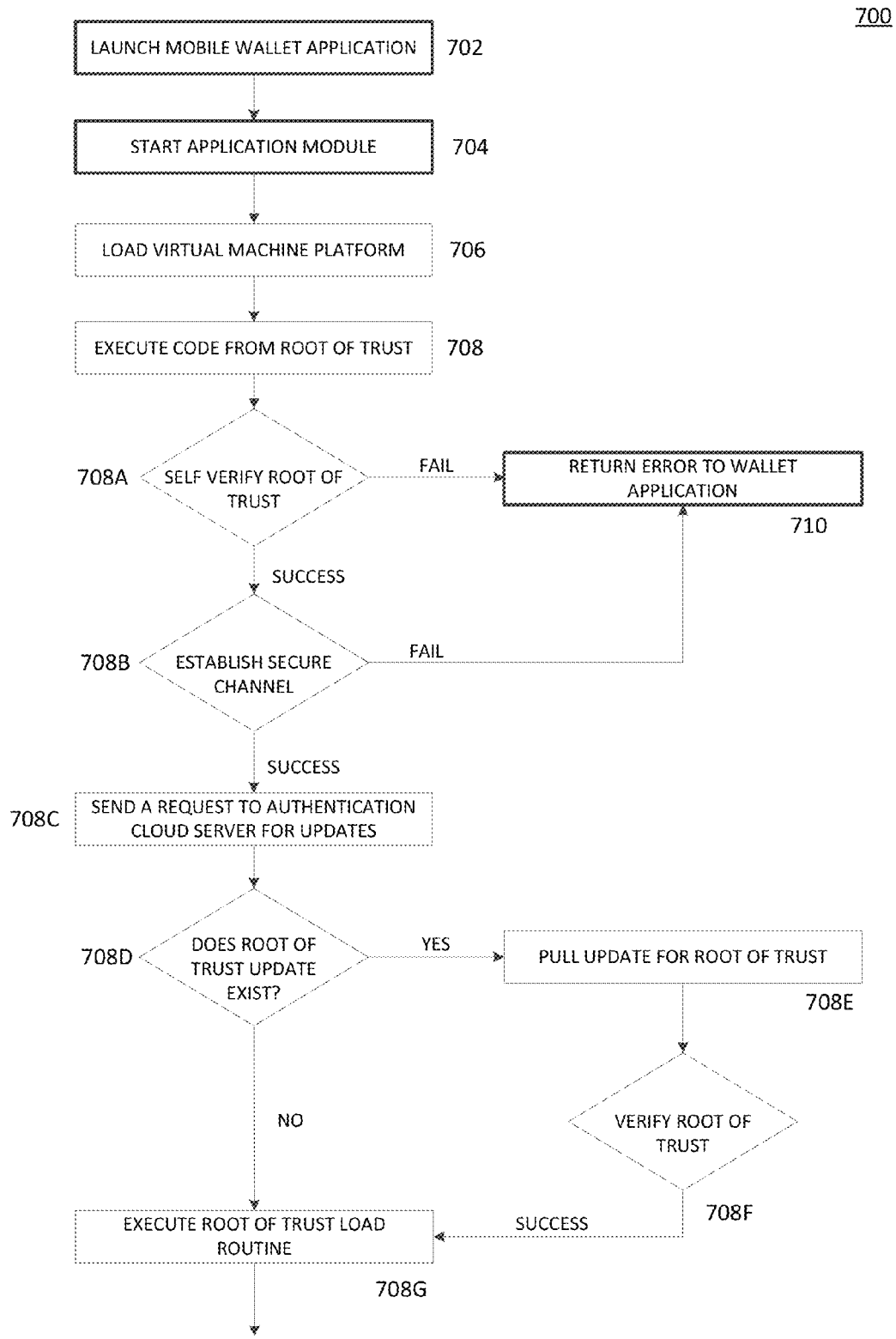
FIGS. 7A-7D illustrate process flows to build a trust chain in one embodiment of the invention.
Figure 7B:
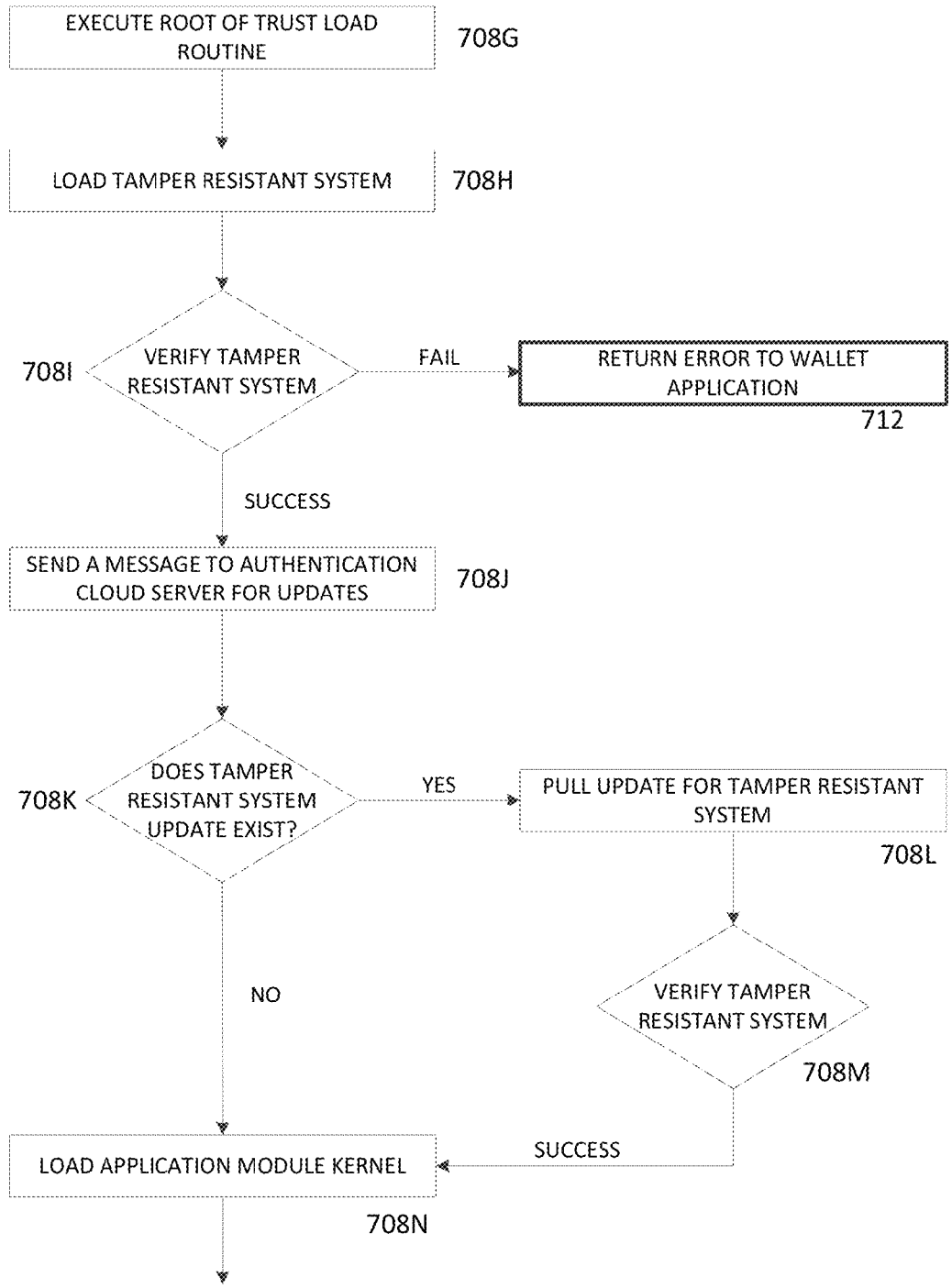
Figure 7C:
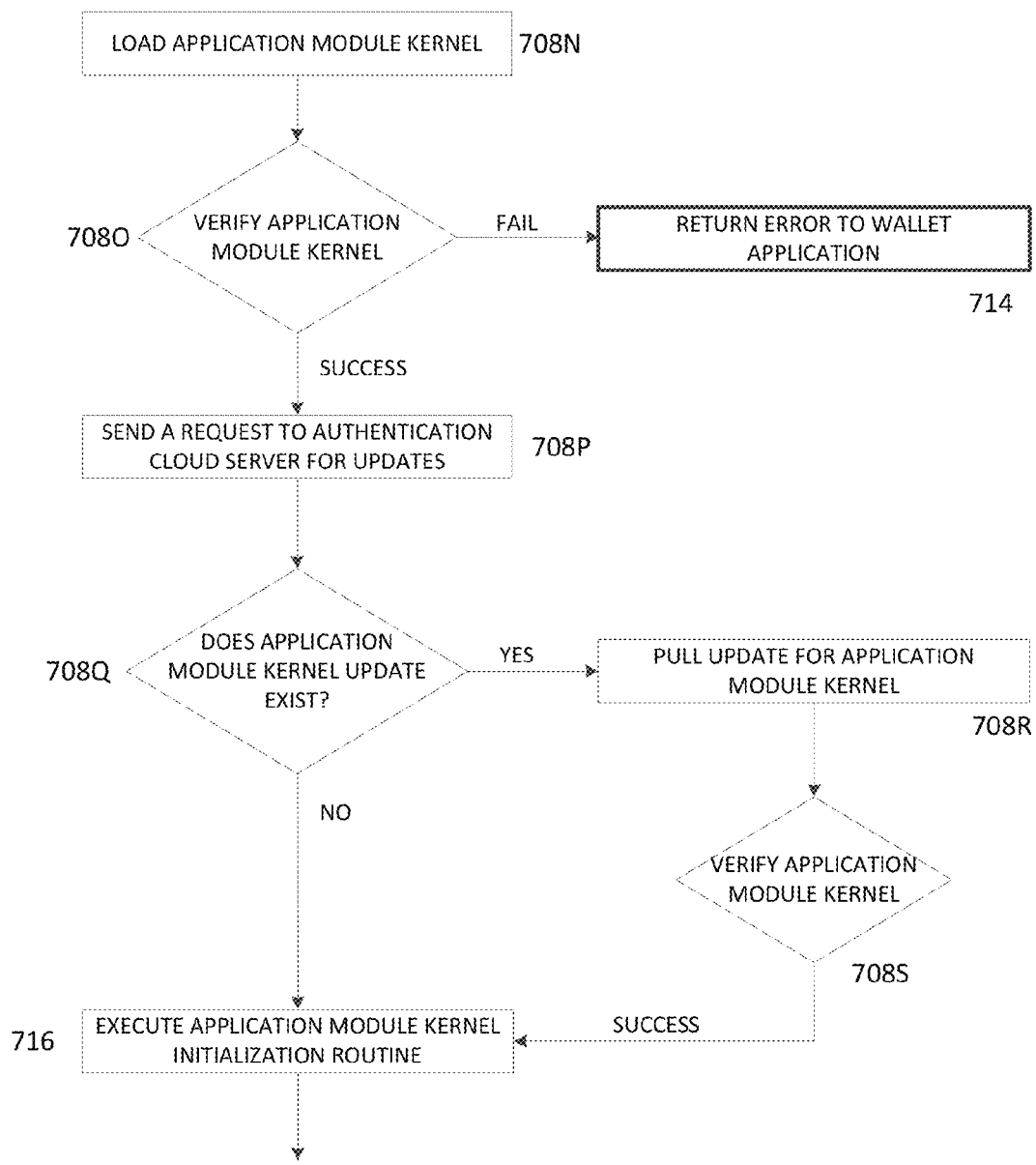
Figure 7D:
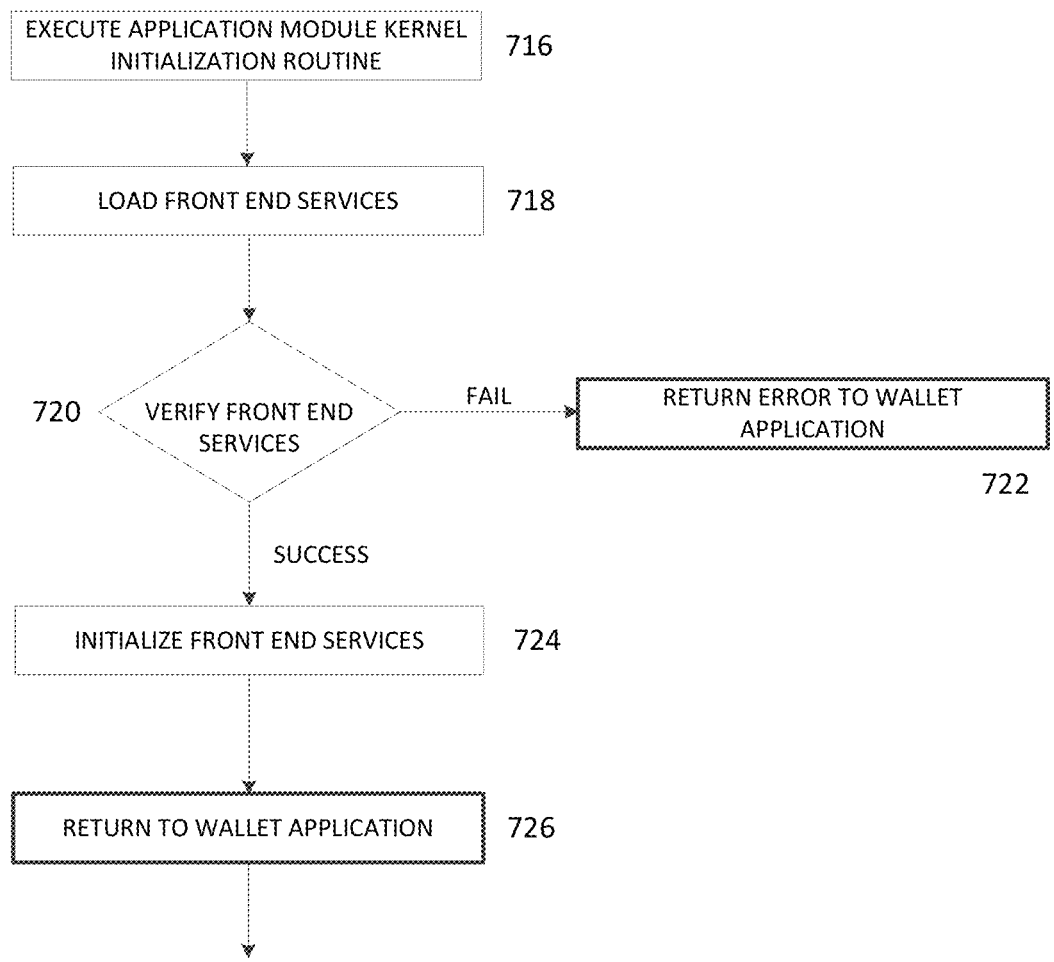

FIG. 6 illustrates a process flow 600 for the secure update of the application module 102B.

In step 602, the application module 102B may attempt to set up a secure channel with the authentication cloud server 108. For example, the secure channel may be established using keys stored in the key store 406D. In one implementation, the secure channel may be established using a secure network stack implemented within the secure application module. In another implementation, the secure channel may be established using an authenticated network stack from the operating environment, such as the operating system.

In step 604, the authentication cloud server 108 can request the current version of the application module 102B from the update service module 402A. The version number of the application module 102B, may include a collective version identifier for all of the components of the application module 102B, or may include separate version identifiers for each component of the application module 102B. In one implementation, the version number may be optionally signed and/or encrypted using a key stored by the application module 102B. In one implementation, the authentication cloud server 108 may request version identifiers for individually identifying each component of the application 102B or a combination of components. As described previously, the request for the version number of the application module 102B, may be in response to an expiration of a timer, occurrence of an event or request for update of the software.

In step 606, the update service module 402A can request the current version from the data store 406C in the application kernel 404 along with the attested/measured values. In step 608, the application kernel 404 can retrieve the current version from the data store 406C along with the attested/measured values.

In step 610, the application module 102B can send the current version of the application module 102B or modules thereof, with the attested/measured values to the authentication cloud server 108 over the secure channel. In some implementations, a timestamp value may also be included with the response. The timestamp value may include the time at which the measurement was performed and/or the time at which the application module 102B sends the response to the authentication cloud server 108.

In step 612, the authentication cloud server 108 can determine if the application module 102B is out-of-date. In some implementations, the determination step may be performed based on the version number of the application module 102B received from the mobile device 102. In some implementations, the determination step may be performed by comparing the attestation/measurement value provided by the application module 102B executing on the mobile device 102 and the attestation/measurement value calculated and stored locally by the authentication cloud server 108.

In step 614, the authentication cloud server 108 can force download of the up-to-date application module 102B. The authentication cloud server 108 may force a download for a variety of reasons. For example, the authentication cloud server 108 may force an update if the code running as part of the application module 102B is out-of-date (determined using the version number of the application module 102B), or if the attestation/measurement values do not match up with the values stored locally by the authentication cloud server 108. The authentication cloud server 108 may interpret any deviation of the attestation/measurement value received from the mobile device 102 from the value stored locally at the authentication cloud server 108, as a trigger for taking further action, such as forcing an update.

In step 616, new version of the application module 102B is received and stored by the SDK update service module 402A on the mobile device 102B.

In step 618, the update service module 402A can request the application module kernel 404 to verify the new version of the application module 102B. In step 620, the application module kernel 404 can request the tamper resistant system 406 to verify the new version of the application module 102B. In step 622, the tamper resistant system 406 can verify the new version of the application module 102B using keys retrieved from the key store 406D. For example, the tamper resistant system 406 may authenticate the new version of the application module 102B using a public key associated with the authentication cloud server 108. In one implementation, the public key associated with the authentication cloud server 108 may be stored in the key store 406D.

In step 624, after the new version of the application module 102B is verified, a success message can be returned to the application kernel 404 from the tamper resistant system 406.

In step 626, the new version of the application module 102B can be committed to the storage managed by the mobile OS platform 102C. Committing the new version of the application module 102B to storage may refer to either replacing the old version or tagging the new version of the application module 102B such that on the next restart the new version of the application module 102B is loaded.

In step 628, a success message can be returned to the update service 402A from the application module kernel 404. The success message indicates to the update service that the application module 102B was properly stored and upon the next restart, the new version of the application module 102B will be loaded.

In step 630, the update service 402A can restart the application module 102B and allow rebuilding the trust chain. On the restart of the application module 102B, the system loads the new version of the application module 102B instead of the old version, rebuilds the trust chain and updates the measurements in the data store 406C and/or key store 406D. Rebuilding the trust chain may include similar steps previously described in FIG. 3 from 310-316.

FIGS. 7A-7D illustrate process flows to build a trust chain in one embodiment of the invention. The trust chain can be built when the application module 102B is initialized after launch of the mobile wallet application 102A or the application module 102B is reset due to a watchdog timer event or due to a remote request from the authentication cloud server 108.

In step 702, a mobile wallet application is launched. For example, the user 104 may launch the mobile wallet application 102A on the mobile device 102. In another example, the mobile wallet application 102A may automatically launch in response to a payment transaction.

In step 704, an application module is started. In some embodiments, the application module 102B may be started from the mobile wallet application 102A, for example, the application module 102B may be integrated with the mobile wallet application 102A. In certain implementations, the mobile wallet application 102A utilizes security functionality provided by the application module and cannot operate without the launch of the application module 102B. For example, the application module may provide an API for the mobile wallet application 102A to invoke for performing certain security functions, such as encryption.

In step 706, the virtual machine platform 408 is loaded. In some embodiments, the virtual machine platform 408 may be loaded as part of the initialization routine of the application module 102B. In one implementation, the application module 102B may be executed within a container, such as a virtual machine managed by a virtual machine monitor. The virtual machine platform 408 may allow the application module 102B to execute in isolation with respect to other potentially malicious software running on the same system.

In step 708, the code is executed from root of trust. In some embodiments, the root of trust 406B may be loaded as part of the initialization routine of the application module 102B. In certain embodiments, the code associated with the root of trust may be trusted over other components in the application module 102B.

In step 708A, the root of trust is self-verified. For example, in one embodiment, at the time of initialization, the root of trust 406B may be verified by comparing the root of trust value or measurement associated with the root of trust with a value stored for the root of trust on the system. For example, the initialization root of trust value may be stored in a secure element of the mobile device 102. In another embodiment, the root of trust may be verified with an endorsement key stored in the key store 406D.

In step 710, if self-verification of the root of trust 406B fails, an error message may be returned to the mobile wallet application module 102A. In some instances, the application module 102B may not launch or launch with limited functionality, in the event that the self-verification processor does not succeed.

In step 708B, if self-verification of the root of trust 406B succeeds, a secure channel may be established with the authentication cloud server 108. A secure channel may be established using a secure network stack operating from within the application module 102B. Example protocols, such as SSL (Secure Socket Layer) may be used in establishing a secure channel. In one implementation, if a secure channel cannot be established with the authentication cloud server 108, an error message may be returned to the mobile wallet application module 102A. In some instances, the application module 102B may not launch or launch with limited functionality, in the event that the secure channel cannot be established.

In step 708C, a request to the authentication cloud server 108 is sent for updates to the root of trust 406B. In one embodiment, the SDK update service module 402A may send the request to the authentication cloud server 108. Since the trust in the application module 102B and the transactions performed using the mobile wallet application 102A originate from the root of trust used by the application module 102B, the application module confirms with the authentication cloud server 108 that the mobile device is not executing an outdated root or trust.

In step 708D, the authentication cloud server 108 determines if an update of the root of trust exists. For example, the root of trust may have been updated at the authentication cloud server 108 from the time the application module 102B was reset or initialized. Updates to the root of trust stored at the authentication cloud server 108 may be as a result of new code releases with bug fixes, new code releases with new features, or new code releases with security fixes.

In step 708E, if an update to the root of trust exists, the mobile device 102 may pull the updated root of trust from the authentication cloud server 108. For example, the SDK update service module 402A may pull the updated root of trust from the authentication cloud server 108 and store it locally in memory on the mobile device 102.

In step 708F, the updated root of trust is verified. In one embodiment, the root of trust may be verified by using a key from the key store 406D. For example, the mobile device 102 may ensure that the root of trust is generated/provided by the authentication cloud server 108 by verifying the signature of the root of trust using a public key for the authentication cloud server 108 stored in the key store 406D.

In step 708G, if verification of the updated root of trust is successful, the root of trust load routine is executed to load the verified root of trust in the root of trust 406B. In one implementation, if the verification process fails, an error message may be sent to the mobile wallet application 102A and the authentication cloud server 108.

In embodiments of the invention, update of the root of trust 406B results in re-establishment of the trust chain, e.g., updating the software layers built upon the root of trust. As discussed with reference to FIG. 7B, update of the root of trust 406B results in update of the tamper resistant system 406.

In step 708H, the tamper resistant system 406 is loaded. In one embodiment, the tamper resistant system 406 is loaded as part of executing the root of trust load routine. The tamper resistant system may install mechanisms to protect the execution of the code executing inside the application module 102B.

In step 708I, the tamper resistant system 406 is verified. For example, the tamper resistant system 406 may be verified by comparing the measurements of the tramper resistant system 406 with attested value of the tamper resistant system 406 stored in a secure location. At this point, since a secure channel exists, in one implementation, the tamper resistant system 406 may be verified against values requested and received from the authentication cloud server 108. In another implementation, the measurement of the tamper resistant system 406 may be compared with a locally stored value.

In step 712, if verification of the tamper resistant system 406 fails, an error message is returned to the mobile wallet application module 102A. In some instances, the application module 102B may not launch or launch with limited functionality, in the event that the tamper resistant verification process fails.

In step 708J, if verification of the tamper resistant system 406 succeeds, a request to the authentication cloud server 108 is sent for updates to the tamper resistant system 406. In one embodiment, the secure channel between the mobile device 102 and the authentication cloud server 108 may be utilized for sending the request to the authentication cloud server 108 for updates.

In step 708K, it is determined if an update to the tamper resistant system 406 exist. For example, the tamper resistant system may have been updated due to the update of the code of the tamper resistance system, since the application module 102B was last initialized.

In step 708L, if an update exists, the update for the tamper resistant system 406 is pulled from the authentication cloud server 108. The updates are received by the mobile device 102, using the secure channel between the mobile device 102 and the authentication wallet server 108.

In step 708M, the tamper resistant system 406 is verified. In some embodiments, the tamper resistant system 406 may be verified by using a public key associated with the authentication cloud server 108 from the key store 406D or a certificate.

In step 708N, the application module kernel 404 is loaded. In embodiments of the invention, as part of rebuilding the trust chain, update of the tamper resistant system 406 results in updating the application module kernel as discussed with reference to FIG. 7C.

In step 708O, the application module kernel 404 is verified. For example, the application module kernel 404 may be verified by comparing with attested value of the application module kernel 404 stored in a secure location (e.g., secure element). In another implementation, the application module kernel 404 may be verified against values requested and received from the authentication cloud server 108. In another implementation, the measurement of the application module kernel 404 may be compared with a locally stored value (e.g., key store, secure element, etc.).

In step 714, if verification of the application module kernel 404 fails, an error message is returned to the mobile wallet application module 102B. In some instances, the application module 102B may not launch or launch with limited functionality, in the event that the application module kernel 404 verification process fails.

In step 708P, if verification of the application module kernel 404 succeeds, a request to the authentication cloud server 108 is sent for updates to the application module kernel 404. In one embodiment, the secure channel between the mobile device 102 and the authentication cloud server 108 may be used for sending the request to the authentication cloud server 108 for updates.

In step 708Q, it is determined if an update to the application module kernel 404 exist. For example, the tamper resistant system may have been updated due to the update of the code of the application module kernel 404, since the application module 102B was last initialized.

In step 708R, if an update exists, the update for the application module kernel 404 is pulled from the authentication cloud server 108. The update for the application module kernel 404 may be communicated over the secure channel.

In step 708S, the application module kernel 404 is verified. In some embodiments, the application module kernel 404 may be verified by using a public key associated with the authentication cloud server 108 from the key store 406D or a certificate.

In step 716, initialization routine for the application module kernel 404 is executed. In some embodiments, initialization routine for the application module kernel 404 may include initialization of timers, memories, various interfaces, and reestablishing the secure channel with the authentication cloud server 108. In embodiments of the invention, as part of rebuilding the trust chain, update of the application module kernel 404 results in updating the frontend services as discussed with reference to FIG. 7D.

In step 718, the frontend services are loaded. In one embodiment, the application module frontend services module 402 is loaded within the application module 102B at the end of the application module initialization routine. As previously discussed, the frontend services may provide an interface for other applications, such as the mobile wallet application 102A, for invoking security services provided by the application module 102B.

In step 720, the application module frontend services module 402 is verified. In another implementation, the application module frontend services module 402 may be verified against values requested and received from the authentication cloud server 108. In another implementation, the measurement of the application module kernel 404 may be compared with a locally stored value (e.g., key store, secure element, etc.).

In step 722, if verification of the application module frontend services module 402 fails, an error message is returned to the mobile wallet application module 102A. In some instances, the application module 102B may not launch or launch with limited functionality, in the event that the application module frontend services module 402 verification process fails.

In step 724, if verification of the application module frontend services module 402 succeeds, the application module frontend services module 402 may be initialized. In one embodiment, the secure channel between the authentication cloud server 108 and the application module frontend services module 402 may be established. Once the verification process successfully completes, the application module 102B may be ready for providing security services to other applications, such as the mobile wallet application 102A.

In step 726, the process returns control to the mobile wallet application 102A. In turn, the wallet mobile application 102A may complete its own installation and start processing transactions, such as payment transactions.

Even though, the above figures discuss building a trust chain for four components of the application module 102B, embodiments of the invention are not limited by the specific functionality or number of components comprised by the application module 102B. For example, in another implementation, the application module 102B may have seven (or any number of) components without deviating from the scope of the invention. In such an implementation, aspects of the invention may recursively iterate through each component and verify its integrity and authenticity, check for updates with a remote server (such as the authentication cloud server 108), update the component and rebuild the trust chain if any updates/changes are available, and continue with the loading of the component.

Embodiments of the invention, as described herein, provide a method, system and apparatus for securely updating and maintaining a secure application module. Most security systems and modules define and anchor their security solution based on a hardware root of trust. Typical solutions rely on hardware means to build an immutable root of trust, for example, using a ROM or a flash memory, so that hackers cannot modify the root of trust and subvert the system. However, in many instances, the operating system and other client applications may not be trusted. Additionally, access to the hardware root of trust may be through interfaces provided by the operating system. If the operating system is not trusted the software executing above the operating system, such as the security application module, has no assurance that it can trust the hardware root of trust accessible through the operating system. Furthermore, in some instances the security module may be executing in a virtualized or isolated environment with inadequate visibility to the system hardware for the purposes of assuring security. Thus, update and execution of a hardened root of trust that the security application module can trust, even in instances where the underlying operating system may be in an indeterminate trust state is desirable.

Embodiments of the invention provide a robust root of trust using software means. In contrast to the hardware root of trust, where the trust is established using the immutable nature of the root of trust (e.g., fuses, read only memory, etc.), embodiments of the invention establish trust by frequently revoking and re-provisioning the root of trust within a specific domain, such as the secure application module. The revoking and re-provisioning of the root of trust is performed by a trusted backend server, such as an authentication cloud server, using a secure channel. This is advantageous, since subverting such a dynamic application module by a hacker, as described by embodiments of the invention, where the root of trust is constantly being updated and monitored by a trusted backend server is very difficult. This dynamic nature of the root of trust within the software module may even be better than hardware root of trusts, since most software modules do not have direct access to hardware resources. This is particularly advantageous for a security application module that aims at providing self-contained security and cannot depend or trust the state of the executing environment, such as the underlying operating system or other applications executing on the system.

Along with a dynamic root of trust, embodiments of the invention also describe dynamically updating and monitoring (by the backend server) the trust chain in a self-contained security application module. Embodiments of the invention describe building a trust chain at the time of loading the application module 102B. However, in addition, embodiments of the invention also describe dynamically monitoring and updating each component/module/layer of the application module. Such monitoring and updating of the various components of the application module 102B is advantageous, since a hacker cannot easily find a vulnerable point of entry using any component of the application module 102B, since the various components and the trust chain is updated periodically and based on events (timers, attacks, code updates, etc.,) monitored by the device and/or the backend server.

Therefore, embodiments of the invention are advantageous, since the dynamic nature of the root of trust and the trust chain build using the dynamic root of trust can ensure the authenticity, integrity and confidentiality at load time, run time and update time of the security application module.

The various participants and elements described herein with reference to FIG. 1, may operate one or more computer apparatuses to facilitate the functions described herein. Any of the elements in FIG. 1 including any servers or databases, may use any suitable number of subsystems to facilitate the functions described herein.

Figure 8:
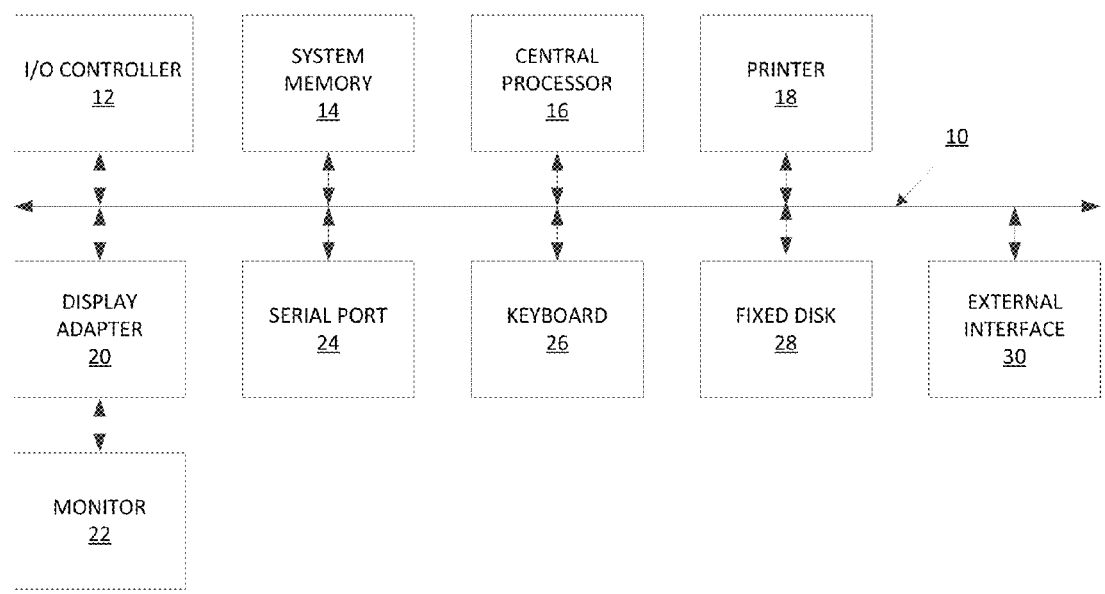
FIG. 8 illustrates a block diagram of a computer apparatus.

Examples of such subsystems or components are shown in FIG. 8. The subsystems shown in FIG. 8 are interconnected via a system bus 10. Additional subsystems such as a printer 30, keyboard 18, fixed disk 20 (or other memory comprising computer readable media), monitor 12, which is coupled to display adapter 14, and others are shown. Peripherals and input/output (I/O) devices, which couple to I/O controller 24 (which can be a processor or other suitable controller), can be connected to the computer system by any number of means known in the art, such as serial port 16. For example, serial port 16 or external interface 22 can be used to connect the computer apparatus to a wide area network such as the Internet, a mouse input device, or a scanner. The interconnection via system bus allows the central processor 28 to communicate with each subsystem and to control the execution of instructions from system memory 26 or the fixed disk 20, as well as the exchange of information between subsystems. The system memory 26 and/or the fixed disk 20 may embody a computer readable medium.

Any of the software components or functions described in this application, may be implemented as software code to be executed by a processor using any suitable computer language such as, for example, Java, C++ or Perl using, for example, conventional or object-oriented techniques. The software code may be stored as a series of instructions, or commands on a computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus, and may be present on or within different computational apparatuses within a system or network.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

One or more features from any embodiment may be combined with one or more features of any other embodiment without departing from the scope of the invention.

A recitation of "a", "an" or "the" is intended to mean "one or more" unless specifically indicated to the contrary.

It should be understood that the present invention as described above can be implemented in the form of control logic using computer software in a modular or integrated manner. Based on the disclosure and teachings provided herein, a person of ordinary skill in the art will know and appreciate other ways and/or methods to implement the present invention using hardware and a combination of hardware and software.

What is claimed is:

1. A method comprising:
    a) determining that a first root of trust, comprising executable instructions, for an application module stored in memory of a communication device needs to be updated, the application module comprising an application module kernel and an application module frontend, wherein the application module frontend has low tamper resistance, the application module kernel has medium tamper resistance, and the first root of trust has heavy tamper resistance;
    b) receiving a second root of trust, comprising executable instructions, for the application module at the communication device;
    c) after receiving the second root of trust, using the executable instructions from the second root of trust to generate a first attestation value for the application module kernel and using executable instructions from the application module kernel to generate a second attestation value for the application module frontend in a trust chain verification process; and
    d) storing the first attestation value and the second attestation value determined during the trust chain verification process.

2. The method of claim 1, wherein the trust chain verification process is a first trust chain verification process, wherein the determined attestation values are first determined attestation values, and wherein the method further comprises:
    e) determining that the second root of trust in the communication device needs to be updated;
    f) receiving a third root of trust to the communication device;
    g) after receiving the third root of trust, determining new attestation values for the application module kernel and the application module frontend in a second trust chain verification process; and
    h) storing the determined attestation values determined during the second trust chain verification process.

3. The method of claim 1, wherein in step a), determining is based upon at least one of (i) a specific elapsed time, (ii) an application module event, and (iii) a patch cycle.

4. The method of claim 1 wherein in step b), the second root of trust is received from a remote server computer.

5. The method of claim 1 wherein the communication device is a mobile phone.

6. A communication device comprising a processor and a computer readable medium coupled to the processor, the computer readable medium comprising code, executable by the processor to:
    a) determine that a first root of trust, comprising executable instructions, for an application module in a communication device needs to be updated, the application module comprising an application module kernel and an application module frontend, wherein the application module frontend has low tamper resistance, the application module kernel has medium tamper resistance, and the first root of trust has heavy tamper resistance;
    b) receive a second root of trust, comprising executable instructions, for the application module at the communication device;
    c) after receiving the second root of trust, using the executable instructions from the second root of trust to generate a first attestation value for the application module kernel and using executable instructions from the application module kernel to generate a second attestation value for the application module frontend in a trust chain verification process; and
    d) store the first attestation value and the second attestation value determined during the trust chain verification process.

7. The communication device of claim 6, wherein the trust chain verification process is a first trust chain verification process, wherein the determined attestation values are first determined attestation values, and wherein the communication device further comprises code, executable by the processor to:
    e) determine that the second root of trust in the communication device needs to be updated;
    f) receive a third root of trust to the communication device;
    g) after receiving the third root of trust, determining new attestation values for the application module kernel and the application module frontend in a second trust chain verification process; and
    h) store the determined attestation values determined during the second trust chain verification process.

8. The communication device of claim 6, wherein in step a), determining is based upon at least one of (i) a specific elapsed time, (ii) an application module event, and (iii) a patch cycle.

9. The communication device of claim 6 wherein in step b), the second root of trust is received from a remote server computer.

10. A method comprising:
   a) monitoring a first root of trust, comprising executable instructions, for an application module in a communication device, the application module comprising an application module kernel and an application module frontend, wherein the application module frontend has low tamper resistance, the application module kernel has medium tamper resistance, and the first root of trust has heavy tamper resistance;
   b) determining that the first root of trust in the communication device needs to be updated;
   c) providing a second root of trust, comprising executable instructions, for the application module to the communication device after determining that the first root of trust in the communication device needs to be updated;
   d) determining a first attestation value for the application module kernel using the executable instructions from the second root of trust and determining a second attestation value for the second application application module frontend using the executable instructions from the first application module kernel in a trust chain verification process; and
   e) storing the first attestation value and the second attestation value determined during the trust chain verification process.

11. The method of claim 10, further comprising:
   f) sending a query to the communication device to provide the first attestation value and the second attestation value determined by the communication device;
   g) comparing stored attestation values with the first attestation value and the second attestation value provided by the communication device; and
   h) determining trustworthiness of the communication device based on the comparison.

12. The method of claim 10 wherein in step b), determining is based upon at least one of (i) a specific elapsed time, (ii) an application module event, and (iii) a patch cycle.

13. A remote server computer comprising a processor and a computer readable medium coupled to the processor, the computer readable medium comprising code, executable by the processor to:
   a) monitor a first root of trust, comprising executable instructions, for an application module in a communication device, the application module comprising an application module kernel and an application module frontend, wherein the application module frontend has low tamper resistance, the application module kernel has medium tamper resistance, and the first root of trust has heavy tamper resistance;
   b) determine that the first root of trust in the communication device needs to be updated;
   c) provide a second root of trust, comprising executable instructions, for the application module to the communication device after determining that the first root of trust in the communication device needs to be updated;
   d) determine a first attestation value for the application module kernel using the executable instructions from the second root of trust and determining a second attestation value for the application module frontend using the executable instructions from the application module kernel in a trust chain verification process; and
   e) store the first attestation value and the second attestation value determined during the trust chain verification process.

14. The remote server computer of claim 13, wherein the remote server further comprises code executable on the processor to:
   f) send a query to the communication device to provide the first attestation value and the second attestation value determined by the communication device;
   g) compare stored attestation values with the first attestation value and the second attestation value provided by the communication device; and
   h) determine trustworthiness of the communication device based on the comparison.

15. A system of claim 13 comprising the remote server computer and the communication device.

16. The system of claim 15 wherein the communication device is a mobile phone.

\* \* \* \* \*

UNITED STATES PATENT AND TRADEMARK OFFICE
CERTIFICATE OF CORRECTION

| | |
|---|---|
| PATENT NO. | : 9,530,009 B2 |
| APPLICATION NO. | : 14/318070 |
| DATED | : December 27, 2016 |
| INVENTOR(S) | : Selim Aissi, Taeho Kgil and Gyan Prakash |

Page 1 of 1

It is certified that error appears in the above-identified patent and that said Letters Patent is hereby corrected as shown below:

In the Claims

In Column 21, Claim 10, d, Lines 26-28 remove "attestation value for the second application application module frontend using the executable instructions from the first application module kernel in a trust chain"

And insert --attestation value for the application module frontend using the executable instructions from the application module kernel in a trust chain--

Signed and Sealed this
Second Day of January, 2018

Joseph Matal
*Performing the Functions and Duties of the
Under Secretary of Commerce for Intellectual Property and
Director of the United States Patent and Trademark Office*